(12) United States Patent
Krishnasamy et al.

(10) Patent No.: US 10,511,743 B2
(45) Date of Patent: Dec. 17, 2019

(54) METHOD AND APPARATUS FOR INSTANT SECURE SCANNING OF A DOCUMENT

(71) Applicant: Xerox Corporation, Norwalk, CT (US)

(72) Inventors: Muralidaran Krishnasamy, Tamil Nadu (IN); Narayan Kesavan, Tamil Nadu (IN); Raj Kumar, Tamil Nadu (IN)

(73) Assignee: Xerox Corporation, Norwalk, CT (US)

( * ) Notice: Subject to any disclaimer, the term of this patent is extended or adjusted under 35 U.S.C. 154(b) by 90 days.

(21) Appl. No.: 15/623,439

(22) Filed: Jun. 15, 2017

(65) Prior Publication Data

US 2018/0367698 A1 Dec. 20, 2018

(51) Int. Cl.
| | |
|---|---|
| *H04N 1/40* | (2006.01) |
| *H04N 1/44* | (2006.01) |
| *H04N 1/04* | (2006.01) |
| *G06F 21/60* | (2013.01) |
| *G06F 21/32* | (2013.01) |
| *H04L 9/08* | (2006.01) |

(52) U.S. Cl.
CPC .......... *H04N 1/4413* (2013.01); *G06F 21/32* (2013.01); *G06F 21/602* (2013.01); *G06F 21/608* (2013.01); *H04L 9/0861* (2013.01); *H04L 9/0894* (2013.01); *H04N 1/04* (2013.01); *H04N 1/4433* (2013.01)

(58) Field of Classification Search
CPC ...... H04N 1/4413; H04N 1/04; H04N 1/4433; H04N 1/00944; H04N 1/00946; G06F 21/32; G06F 21/602; G06F 21/608; H04L 9/0861; H04L 9/0894

USPC ..... 358/1.16, 403, 404, 444, 468, 1.15, 445, 358/474

See application file for complete search history.

(56) References Cited

U.S. PATENT DOCUMENTS

| | | | |
|---|---|---|---|
| 5,832,301 A | 11/1998 | Yamaguchi | |
| 5,860,066 A | 1/1999 | Rouse | |
| 5,969,826 A | 10/1999 | Dash et al. | |
| 6,111,659 A * | 8/2000 | Murata | G03G 15/5066 358/296 |
| 6,867,881 B1 * | 3/2005 | Umezato | H04N 1/00204 358/1.2 |
| 7,844,749 B2 | 11/2010 | Tredoux et al. | |
| 7,869,063 B2 | 1/2011 | Fukano | |
| RE42,290 E | 4/2011 | Ogino | |
| 7,933,035 B2 | 4/2011 | Okada et al. | |

(Continued)

*Primary Examiner* — Cheukfan Lee
(74) *Attorney, Agent, or Firm* — Fox Rothschild LLP

(57) ABSTRACT

A scanning device for automatically scanning and processing a document includes at least a port for communicating with a portable memory device, an image sensor and a processing device. The scanning device may detect a trigger event by detecting that the portable memory device is communicatively coupled to the port. The scanning device may automatically determine a scan instruction, automatically cause the image sensor to scan a physical document based on the scan instruction, determine a secure access token, and save the digital document file to the portable memory device with the secure access token. The secure access token may be an encryption key that is associated with a log-in password of an authenticated user of the scanning device. The scanning device may obtain the encryption key from a storage medium of the scanning device or from a network.

27 Claims, 6 Drawing Sheets

(56) References Cited

U.S. PATENT DOCUMENTS

| | | | |
|---|---|---|---|
| 7,952,731 B2 | 5/2011 | Utsunomiya et al. | |
| 7,969,593 B2 | 6/2011 | Toda | |
| 8,115,949 B2 | 2/2012 | Toda | |
| 8,115,959 B2* | 2/2012 | Yamada | H04N 1/2104 358/1.13 |
| 8,441,666 B2 | 5/2013 | Tomii et al. | |
| 8,599,395 B2 | 12/2013 | Sasakura | |
| 8,817,319 B2 | 8/2014 | Martin | |
| 8,947,683 B2 | 2/2015 | Tominaga | |
| 9,009,359 B2 | 4/2015 | Ashok et al. | |
| 9,185,245 B2 | 11/2015 | Miyachi et al. | |
| 9,245,130 B2 | 1/2016 | Ashok et al. | |
| 9,245,131 B2 | 1/2016 | Ashok et al. | |
| 9,661,170 B2 | 5/2017 | Mitsuyama et al. | |
| 9,674,383 B2 | 6/2017 | Suzuki | |
| 9,727,288 B2 | 8/2017 | Kesavan et al. | |
| 9,740,447 B1 | 8/2017 | Krishnasamy et al. | |
| 9,800,752 B2 | 10/2017 | Hirasawa | |
| 9,854,105 B1 | 12/2017 | Krishnasamy et al. | |
| 2002/0093682 A1* | 7/2002 | Nakajima | H04N 1/00132 358/1.16 |
| 2003/0172117 A1* | 9/2003 | Henry | G06Q 10/107 709/206 |
| 2004/0057073 A1 | 3/2004 | Egawa et al. | |
| 2004/0170274 A1* | 9/2004 | Machida | H04N 1/44 380/46 |
| 2004/0220772 A1* | 11/2004 | Cobble | G06Q 30/02 702/183 |
| 2005/0051942 A1 | 3/2005 | Kubo et al. | |
| 2006/0061823 A1 | 3/2006 | Riesel et al. | |
| 2006/0132841 A1 | 6/2006 | Park et al. | |
| 2006/0221372 A1 | 10/2006 | Onishi et al. | |
| 2006/0265743 A1* | 11/2006 | Kusunoki | H04N 1/00 726/21 |
| 2006/0268310 A1 | 11/2006 | Tamai et al. | |
| 2007/0109600 A1 | 5/2007 | Ren et al. | |
| 2007/0229899 A1 | 10/2007 | Okuda | |
| 2008/0040358 A1* | 2/2008 | Deng | G06F 3/0607 |
| 2008/0080001 A1 | 4/2008 | Yamada | |
| 2008/0198412 A1 | 8/2008 | Yamada | |
| 2008/0218795 A1* | 9/2008 | Kamasuka | G06F 3/1204 358/1.15 |
| 2008/0239383 A1 | 10/2008 | Okajima | |
| 2009/0125726 A1* | 5/2009 | Iyer | G06F 11/1068 713/189 |
| 2009/0128862 A1 | 5/2009 | Nolepa et al. | |
| 2009/0135448 A1* | 5/2009 | Kawara | G06F 21/608 358/1.15 |
| 2009/0204804 A1* | 8/2009 | Okubo | G06F 21/31 713/100 |
| 2010/0074442 A1* | 3/2010 | Ohara | G06F 21/83 380/243 |
| 2010/0188682 A1 | 7/2010 | Shirai | |
| 2010/0231968 A1 | 9/2010 | Hirasawa et al. | |
| 2010/0241868 A1* | 9/2010 | Nachef | G06F 21/31 713/186 |
| 2010/0268934 A1* | 10/2010 | Hinton | H04L 63/0428 713/152 |
| 2011/0085205 A1 | 4/2011 | Ouchi | |
| 2011/0090533 A1 | 4/2011 | Shimizu | |
| 2011/0242580 A1 | 10/2011 | Tran | |
| 2011/0292430 A1 | 12/2011 | Kang et al. | |
| 2012/0050823 A1* | 3/2012 | Khawaja | H04N 1/00212 358/474 |
| 2012/0069375 A1 | 3/2012 | Sasakura | |
| 2012/0140266 A1 | 6/2012 | Takayama | |
| 2012/0158956 A1 | 6/2012 | Sako | |
| 2012/0194850 A1 | 8/2012 | K. et al. | |
| 2012/0218605 A1 | 8/2012 | Yamada | |
| 2012/0257232 A1 | 10/2012 | Koike | |
| 2012/0307316 A1 | 12/2012 | De Muelenaere et al. | |
| 2012/0327453 A1* | 12/2012 | Katahira | G06F 21/31 358/1.14 |
| 2013/0077115 A1* | 3/2013 | Ozaki | H04N 1/00225 358/1.13 |
| 2013/0120799 A1 | 5/2013 | Maeda | |
| 2016/0092146 A1* | 3/2016 | Adachi | G06F 3/1238 358/1.14 |
| 2016/0241736 A1 | 8/2016 | Saluja et al. | |
| 2016/0292548 A1* | 10/2016 | Nguyenvan | G06K 15/1868 |
| 2017/0139652 A1 | 5/2017 | Kesavan et al. | |
| 2017/0374206 A1* | 12/2017 | Krishnasamy | H04N 1/00037 |
| 2018/0095683 A1* | 4/2018 | Okada | G06F 3/0619 |
| 2018/0288272 A1* | 10/2018 | Yamamoto | H04N 1/2158 |

\* cited by examiner

METHOD AND APPARATUS FOR INSTANT SECURE SCANNING OF A DOCUMENT

BACKGROUND

This disclosure relates to scanning a document and particularly to secure scanning and saving a document instantly with little or no user activation of a local user interface (LUI).

In performing a conventional scanning job in a document system or a multifunction peripheral (MFP), in which the task is to scan a document to a storage medium (e.g., hard drive or other memory), a user normally needs to perform several steps. For example, in a normal scan job, the user needs to place the documents on the scanning device's document handler, use the LUI to enter the file directory in which the scanned document files will be stored, then push the "start" button to start the job. In a networked environment, a user may select to scan to a storage medium, such as a directory on a network or a directory on a portable memory device, e.g. a USB drive. However, the user still needs to browse and select the destination directory before pushing the "start" button. As such, there is a need for instant scanning of a document with little or no user activation of an LUI.

Further, in a scanning device, the confidentiality of the documents to be scanned is often unknown. In some scenarios, a document to be scanned may be confidential. For example, a pay slip or a bank document, when scanned into a digital document file, needs to be password protected or saved with secure access tokens. As such, there is also a need for secure scanning of a document with little or no user activation of an LUI.

This document describes a system that may address at least some of the issues described above.

SUMMARY

A portable memory device may include a non-transitory computer-readable medium containing a file system that contains a folder of a designated name, the folder containing a scan instruction and configured to be identifiable and retrievable by a scanning device when the portable memory device is communicatively coupled to the scanning device and detected by the scanning device. The portable memory device also contains programming instructions containing an encryption algorithm that is retrievable by the scanning device. When retrieved by the scanning device, the programming instructions and scan instructions may cause the scanning device to: (i) cause an image sensor to scan a physical document and generate a digital document file corresponding to the physical document based on the scan instruction; (ii) use the encryption algorithm to generate a secure access token; and (iii) save the digital document file to the portable memory device with the secure access token. The portable memory device is communicatively coupleable to an external device or a communication network to preconfigure the folder through a web user interface (web-UI).

In some scenarios, the programming instructions contained in the portable memory device, when retrieved by the scanning device, will cause the scanning device to determine that the digital document file corresponding to the physical document be stored in a folder of the designated name with security protection. Subsequently, the scanning device will automatically save the digital document file to the folder with a secure access token. The programming instructions contained in the portable memory device may also comprise programming instructions that, when retrieved by the scanning device, will cause the scanning device to output a prompt on a local user interface of the scanning device to prompt an authenticated user of the scanning device to confirm whether to apply a log-in password of the authenticated user to generate the secure access token. The programming instructions may also cause the scanning device to prompt a user of the scanning device to enter a password on a local user interface, and apply the encryption algorithm to generate the secure access token.

In some scenarios, a scanning device for automatically scanning and processing a document includes a port for communicating with a portable memory device described above, an image sensor, a processing device, and a computer-readable memory containing programming instructions that will cause the processing device to: (i) detect a trigger event by detecting that the portable memory device is communicatively coupled to the port, (ii) automatically determine a scan instruction comprising at least one scan setting, (iii) automatically cause the image sensor to scan a physical document to generate a digital document file corresponding to the physical document based on the scan instruction; (iv) determine a secure access token, and (v) save the digital document file to the portable memory device with the secure access token.

In some scenarios, the secure access token is an encryption key that is associated with a log-in password of an authenticated user of the scanning device. The scanning device may obtain the encryption key from a storage medium of the scanning device or from a network. For example, the scanning device may prompt a user of the scanning device to enter a password on a local user interface of the scanning device, and apply an encryption algorithm to generate the encryption key. Additionally, the scanning device may also output a prompt on a local user interface of the scanning device to prompt the authenticated user of the scanning device to confirm whether to apply the log-in password to the digital document file corresponding to the physical document.

In some scenarios, the scanning device may detect an additional trigger event by detecting that an additional physical document is placed on the document handler. The scanning device may subsequently automatically scan the additional physical document to generate a digital document file based on the scan instruction, and automatically save the digital document file to the portable memory device with the secure access token.

In some scenarios, optionally, the scan instruction may also include a maximum number of scans, and the scanning device may be configured to count a number of scans after scanning each additional physical document, and suspend scanning additional physical documents when the counted number of scans exceeds the maximum number of scans. Additionally, and/or alternatively, the physical document may include multiple pages and the scan instruction may also include a one-file-per-page setting. In such a case, in saving the digital document file to the portable memory device, the scanning device may save multiple digital document files to the portable memory device, each document file containing a digital representation of a page of the physical document.

In some scenarios, a method for automatically scanning and processing a document using above described scanning device includes, by a processing device of the scanning device: (i) detecting a trigger event by detecting that a portable memory device is communicatively coupled to a port of a scanning device; (ii) upon detecting the trigger event, automatically determining a scan instruction comprising at least one scan setting; (iii) automatically causing an image sensor of the scanning device to scan a physical document to generate a digital document file corresponding to the physical document based on the scan instruction; (iv) determining a secure access token; and (v) saving the digital document file to the portable memory device with the secure access token.

DETAILED DESCRIPTION

Figure 1:
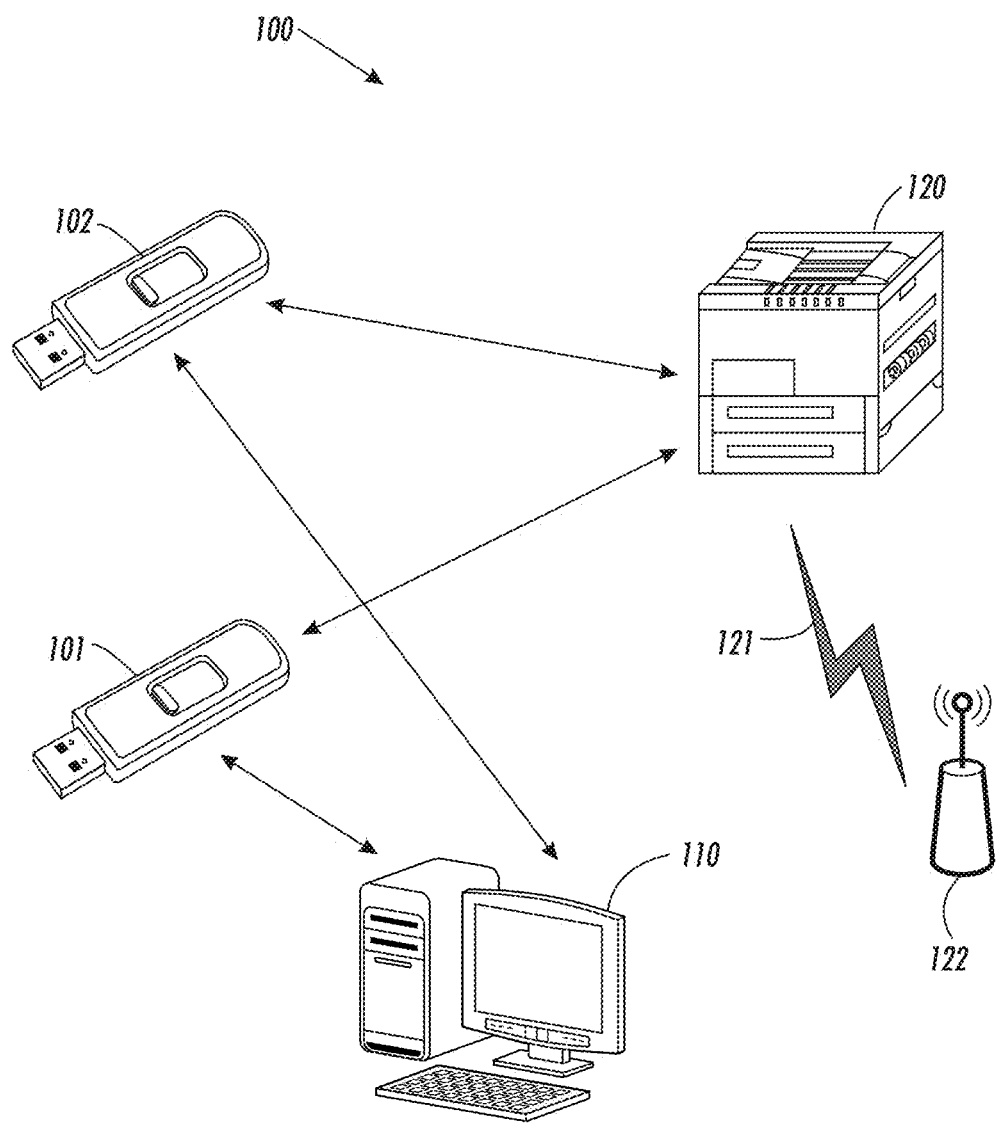
FIG. 1 illustrates an example of a document system for instant secure scanning.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

The term "local user interface" or "LUI" of a device refers to a user interface peripheral that is mounted to or built in an electronic device for users to perform various operations on the device. A local user interface typically includes a combination of hardware (such as a keyboard, keypad, touch-sensitive display and/or microphone) and software for presenting prompts to a user and receiving input from the user via the hardware.

The term "portable memory device" refers to a portable device that has non-transitory storage medium capable of storing data, such as a universal serial bus (USB) flash drive, a secure digital (SD) card or microSD card, a portable hard disk, a portable media player or any other external storage device that has such storing capability. In various embodiments, the portable memory device does not need to include a processor. The portable memory device will typically have a file system. The portable memory device will include a data transfer device, such as a USB connector for a USB drive, input/output ports of an SD card or a radio unit (transceiver) of a near-field communication device such as a Bluetooth device.

A "computer" or "computing device" refers to a device that includes a processor and non-transitory, computer-readable memory. The memory may contain programming instructions that, when executed by the processor, cause the computing device to perform one or more operations according to the programming instructions. Examples of computing devices include personal computers, servers, mainframes, gaming systems, televisions, and portable electronic devices such as smartphones, smart watches, wearable electronic devices, digital cameras, fitness tracking devices, tablet computers, laptop computers, media players and the like.

The term "physical document" refers to a hard-copy document that is printed on a substrate and that can be scanned into a digital form. It may consist of a single sheet or a set of sheets or pages, which may include text, graphics, and/or images.

The term "digital document file," "document file," "electronic document" or "electronic document file" refers to a digital representation of a document such as a word processor file, a PDF file, or a bitmap file (e.g. TIFF, JPG, PNG files etc.) that is stored in a computer readable memory or a storage medium. A document file may be an electronic representation of a document that contains a single page or multiple pages.

The term "document system" refers to a system of devices that communicate with each other for handling document related jobs, in particular, printing, copying, electronic storing, facsimile, transmitting or receiving (including fax, email, or communicating with a remote device), and/or image scanning of a physical document.

The term "scan" refers to a process that generates a digital image representation of a physical document, which may consist of one or multiple page images, and the generating process may be organized into a document processing job.

The term "scanning device" refers to a machine or device having hardware capable of scanning of a physical document and creating an electronic file containing a digital image of the document. Components of a scanning device typically include an image sensor (such as a CCD array or contact image sensor), a glass plate for receiving the document, a lamp, and a processing device. In some embodiments, a scanning device may have additional capabilities and may be, for example, a multifunction print device.

The disclosures described in this patent application provide instant secure scanning of physical documents using a portable memory device in various document systems.

In FIG. 1, a document system 100 includes a scanning device 120 and a computer 110. The scanning device 120 is capable of reading a portable memory device 101, 102 for instantly scanning a physical document and securely storing the scanned document file. The portable memory device 101, 102 may store instructions (e.g. an instruction file stored on a USB flash drive) for the scanning device to perform various operations. The scanning device 120 may retrieve the instructions from the portable memory device 101, 102 and perform various operations. The portable memory device 101, 102 may also be used to store document files that are generated by the scanning device 120. In some scenarios, the scanning device 120 can detect a trigger event, e.g., a portable memory device is communicatively coupled to the scanning device, and a physical document is placed on the document handler of the scanning device 120. The "communicatively coupled" refers to when there exists a communication between the portable memory device and the scanning device. For example, the portable memory device is communicatively coupled to the scanning device when it is plugged into the scanning device via a port, or when it is paired with the scanning device wirelessly.

Further, the scanning device 120 may read the instructions from the portable memory device 101, 102 or retrieve built-in instructions from the scanning device itself and instantly scan the placed document and save the scanned document based on the instructions. For example, the scanning device may automatically scan the physical document to create a digital document file and store the resulting digital document file onto the portable memory device in a designated folder. Alternatively, and/or additionally, the scanning device may scan the physical document and save the digital document file to the destination folder with a secure access token. The scanning device 120 may obtain the secure access token from the device itself or from a communication network 122 via a communication link 121.

Alternatively and/or additionally, the portable memory device 101, 102 may be pre-configured with various instructions by a computing device 110 via a web-UI. For example, the portable memory device 101, 102 may be pre-configured with default scan instructions, with encryption algorithms for generating a secure access token to be used for saving a digital document file representing a scanned document, or with LUI instructions for prompting a user with some instructions in connection with scanning. Alternatively, the computing device 110 may be used to create the file system on the portable memory device. Additionally, the user may plug the portable memory device in a computer and re-configure the instructions at any time.

Figure 2:
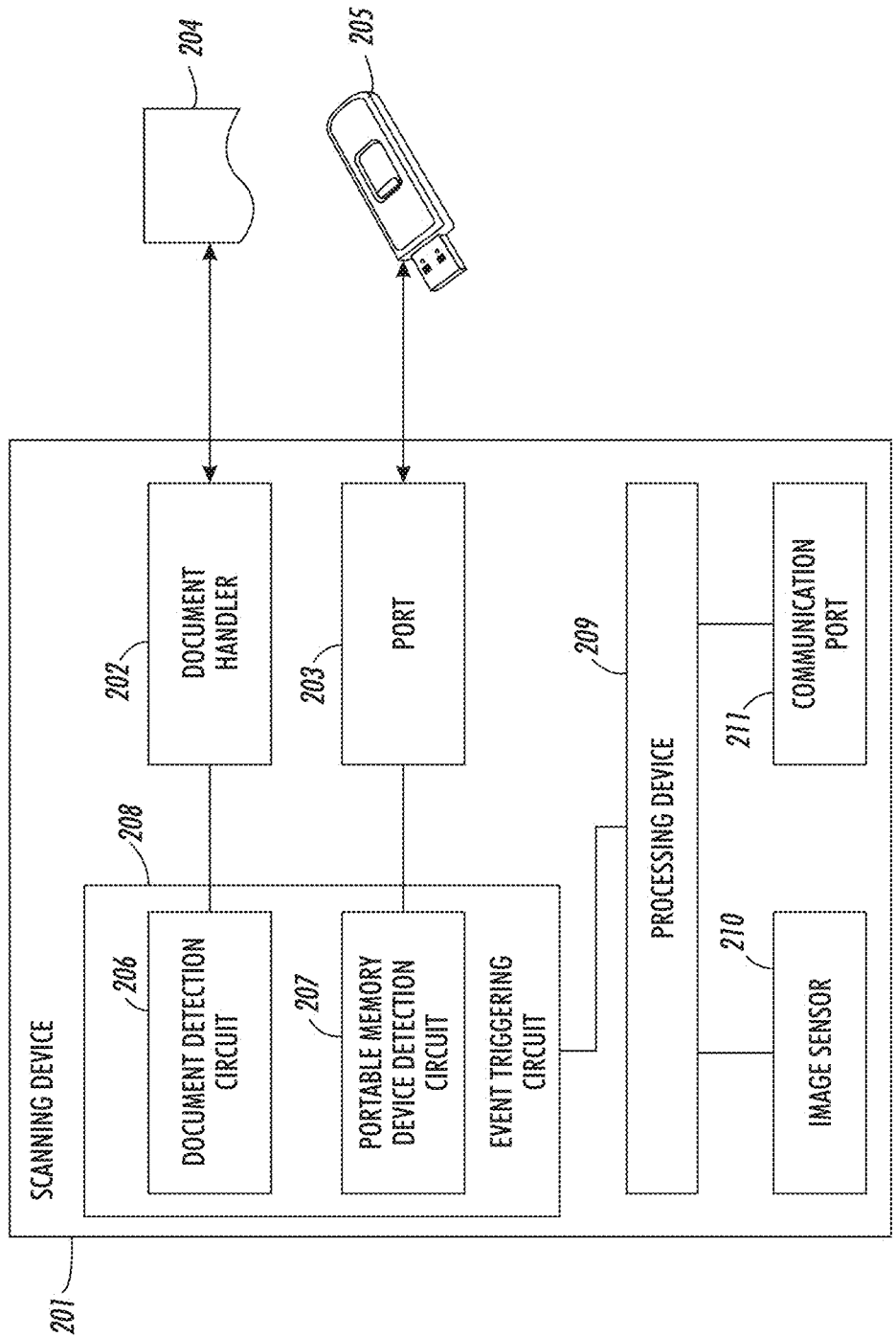
FIG. 2 illustrates a diagram of an example of a scanning device for instant secure scanning.

In FIG. 2, various components in the document system are described in detail. In some scenarios, the scanning device 201 includes a processing device 209 that is communicatively coupled to an image sensor 210 and a communication port 211, wired or wirelessly. The scanning device may also include a document handler 202, upon which a user can load one or more pages of a document 204. The scanning device may contain computer programming instructions that are configured to automatically scan the document pages placed on the document handler without user intervention. The scanning device may also include a peripheral port 203 for plugging in a portable memory device. Additionally, the scanning device may include an event triggering circuit 208 that triggers the scanning device to perform certain operations. The event triggering circuit may include a document detection circuit 206 that includes a circuit and a sensor that detects when a physical document is placed on the document handler. When the sensor detects that a physical document is placed on the document handler, the circuit may generate a trigger to the event trigger circuit, indicating that the document is ready to scan.

Alternatively and/or additionally, the event triggering circuit may include a portable memory device detection circuit 207 that may be communicatively coupled to the port 203. For example, when a portable memory device 205 is plugged into the port 203, the portable memory device detection circuit may detect the status change of the port and subsequently generate a trigger to the event trigger circuit, indicating that user is initiating the scanning device and the instructions for subsequent operations of the scanning device may be available to retrieve from the portable memory device. Alternatively, the scanning device may be capable of pairing with a portable memory device wirelessly, such as via Wi-Fi, Bluetooth or other near-field communication protocols.

Figure 3:
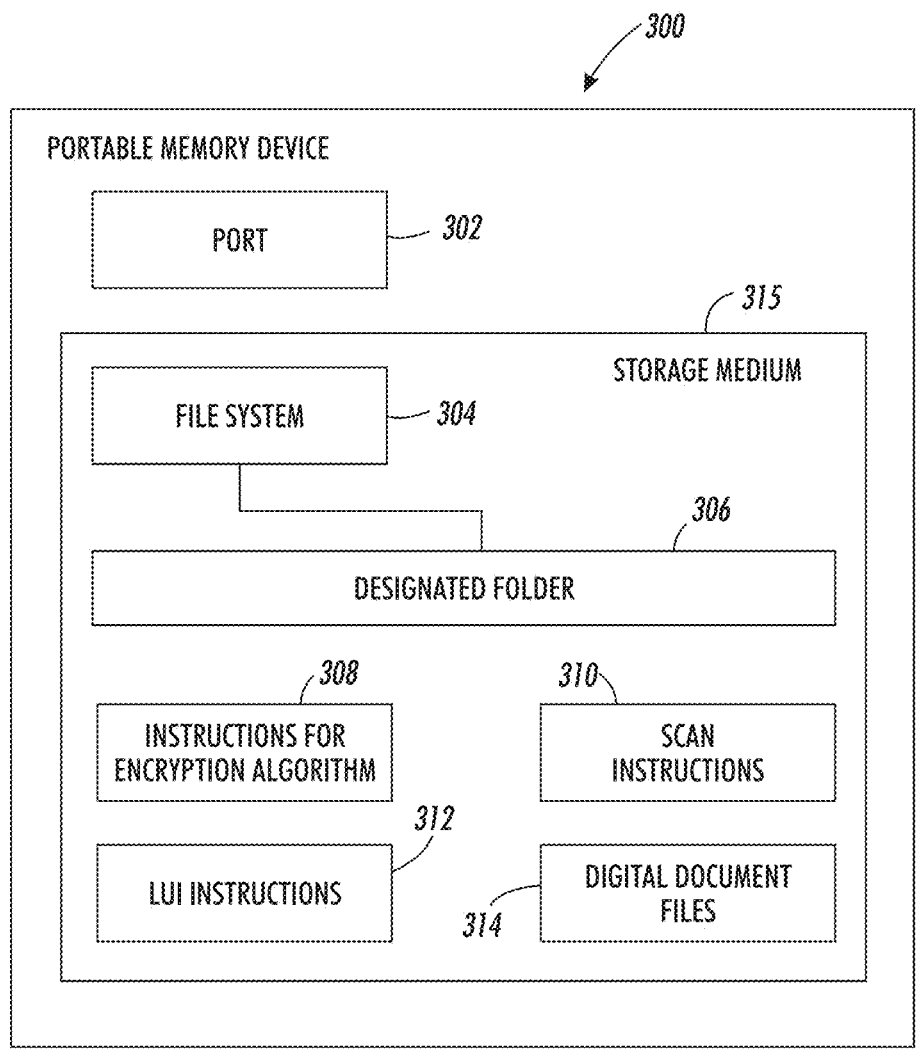
FIG. 3 is a diagram of an example of a portable memory device for instant secure scanning.

In FIG. 3, various components in the portable memory device are described in detail. In some scenarios, the portable memory device 300 includes a port 302 and a storage medium 315. The port 302 is configured to be detectable by a scanning device or communicatively coupled to the scanning device. For example, the port 302 may be a peripheral port, such as a USB, a serial port, a parallel port, a micro-USB or the like. Alternatively and/or additionally, the port 302 may also include a communication port, such as a Wi-Fi, Bluetooth or other near-field communication interfaces.

The portable memory device 300 also includes a non-transitory storage medium 315, such as a flash memory or hard drive. The storage medium 315 may have a file system 304 that has a designated folder 306, such as, e.g. "\insta-scan" or any other names designated for scanning and storing scanned document files. The file system 304 and/or the designated folder 306 may be detectable by and accessible to the scanning device. The portable memory device 300 may also include instructions of encryption algorithms 308, that when retrieved by the scanning device, will cause the scanning device to generate a secure access token, e.g. an encryption key, which can be used for saving in the portable memory device one or more digital document files 314 corresponding to one or more scanned documents.

The portable memory device 300 may also include scan instructions 310, for example, in the designated folder on the portable memory device. The scan instructions 310 may include scan resolution, file format for storing scanned document files, and/or the scan file naming convention. The scanning instructions 310 may also include the name of the destination folder, or a sub-folder thereof, for storing the scanned document files. Additionally, the portable memory device 300 may also include LUI instructions 312 for the scanning device to interact with the user in connection with scanning a document, for example, programming instructions configured to output a prompt to the user to enter a password to be used for protecting a scanned document. When the portable memory device is detected by the scanning device, the scan instructions and/or LUI instructions may also be retrievable by the scanning device, and cause the scanning device to accomplish various tasks, which will be described in detail below.

Figure 4:
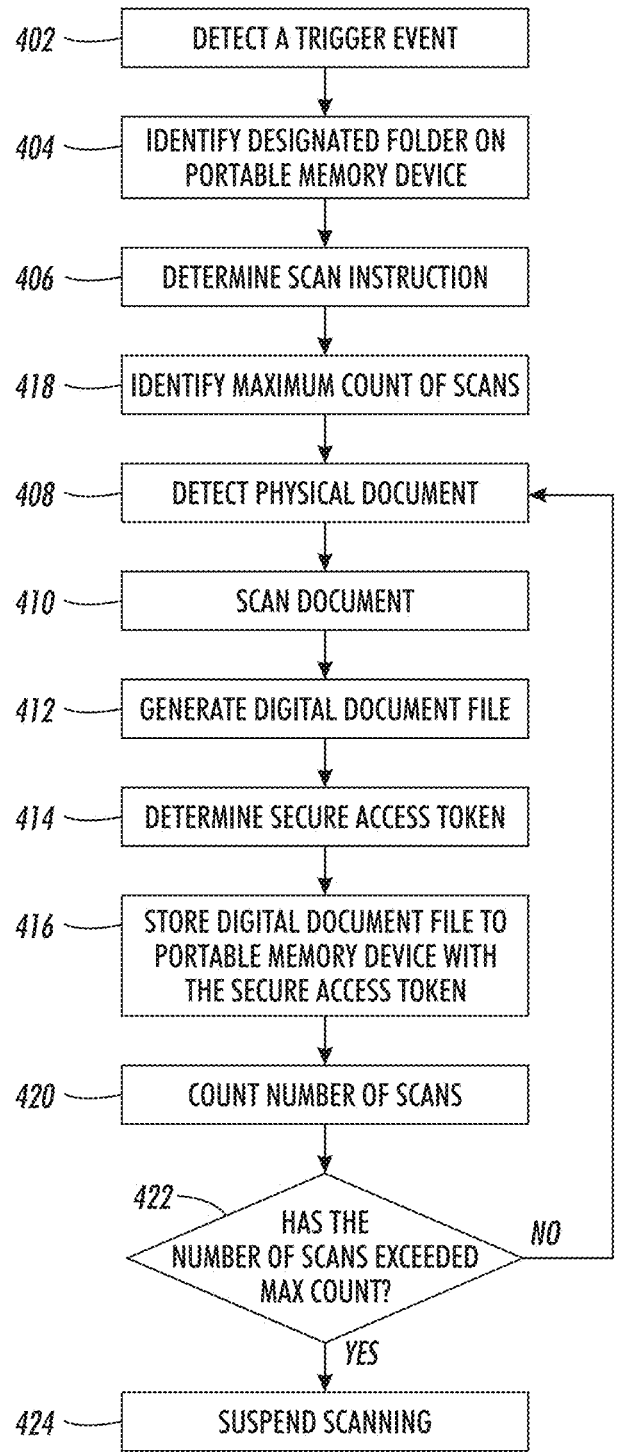
FIG. 4 is a diagram of a process of instant secure scanning.

In FIG. 4, methods for accomplishing various tasks in the systems disclosed in the FIGS. 1-3 are provided. In some scenarios, a method for instant secure scanning of a document includes detecting, by a scanning device, a trigger event 402 that is indicative that the document is ready to scan. For example, detecting the trigger event may include detecting that a portable memory device is communicatively coupled to the scanning device, such as when a USB flash drive is plugged into the port of or when a memory device is paired with the scanning device. Alternatively, and/or additionally, detecting the trigger event may include receiving a trigger from the document detection circuit, indicating that a document is placed on the document handler. For example, the detection circuit may detect that a user has placed the first document on the document handler, where the first document may consist of single or multiple pages.

In some scenarios, the scanning device may detect a trigger event by first detecting that a document is placed on the document handler. The scanning device may then assume that the portable memory device is communicatively coupled to the scanning device, and then identify the designated folder on the portable device. If the portable memory device is not plugged in or paired with the scanning device, the scanning device may output a message to the user to prompt the user to connect the portable memory device, or it may wait for another command or action from the user. Alternatively, the scanning device may detect a trigger event by first detecting that a portable memory device is plugged in or paired with the scanning device. The scanning device may then check whether a document is loaded to the document handler. If no document is placed on the document handler, the scanning device may output a message to the user to prompt the user to load a document.

The scanning device will include program instructions configured to automatically take certain actions in response to detecting the trigger event. For example, with further reference to FIG. 4, once the scanning device detects the trigger event, the scanning device may determine scan instructions 406. In determining the scan instructions, the scanning device may identify the designated folder on the portable memory device 404, e.g. "\insta-scan," and retrieve the scan instructions from the designated folder. Alternatively and/or additionally, the designated folder may be a default folder or may be the root of the portable memory device file directory. In some scenarios, the scan instructions are contained in a scan instruction file, such as in the XML format, and the scanning device may parse the XML scan instruction file and extract relevant fields for scan instructions. Alternatively and/or additionally, the scan instructions may be stored in a non-transitory memory built in the scanning device. The scanning device may include program instructions that can retrieve scan instructions from a default file on the portable memory device (e.g. scan-instruction-.xml) or may use default scan instructions stored in the scanning device.

The scan instructions may contain at least one scan setting. For example, the scan setting may include one or more of the following: scan resolution, scan intensity, scan region (such as a region of 4 by 6 inches relative to the top left corner of the platen of the scanning device for scanning a photo), scan document size (such as letter, legal, and A4 etc.), scan mode (such as document, photo or gray scale), output file format, output compression ratio, and optical character recognition (OCR) options (such as whether to apply OCR to a scanned digital document file) etc. The scan setting may also include user's preference in a situation when one or more scan settings are available in both the portable memory device and the scanning device. In such a case, the user preference determines which scan setting takes control.

With further reference to FIG. 4, upon detecting the trigger event and determining the scan instructions, the scanning device may scan a document 410, which may consist of single or multiple pages, based on the scan instructions, generate a digital document file of the scanned document 412, such as a JPG, PDF, TIFF or any other document format. In some scenarios, the scan instruction may include instruction that a digital document file of a scanned document be stored with security protection, such as with password protection. In other scenarios, based on the designated name of the folder (e.g. \Secure_scan) or data contained in the folder (e.g. the scan instruction), the scanning device determines that the digital document file corresponding to the physical document should be stored in the folder of the designated name with security protection. If security protection is required, the scanning device may determine a secure access token 414, and store the digital document file of the scanned documents to the portable memory device with the secure access token 416 in the designated folder. Storing the scanned document file may be based on the file naming convention that is included in the scan instructions. For example, the document file may be stored as "Myscan001" if the file naming convention specifies the file name prefix to be "Myscan."

The steps described above can repeat for scanning additional sets of documents. Each additional set of documents may contain one or multiple pages. In some scenarios, upon user placing an additional set of documents on the document handler, the scanning device will detect that an additional document has been placed on the document handler 408, and then repeat the step of scanning the document 410, generating digital document file 412, determining secure access token 414, and storing digital document file to the portable memory device with the secure access token 416. This process may repeat for an infinite number of documents until the user unplugs the portable memory device from the scanning device.

With further reference to FIG. 4, in some scenarios, the method may allow the system or user to limit the total number of scans. This maximum count of scans may be included in the scan instructions stored on the portable memory device or may be a default setting of the scanning device. For example, the scanning device may identify the max count of scans 418. Once a max count of scans is identified, each time the scanning device is repeating the scanning steps described above, the scanning device may additionally count the total number of scans 420 and check this number against the max count of scans 422. If the scanning device determines that the total number of scans exceeds the max count of scans, the scanning device may suspend scanning 424 and stop scanning and storing additional documents; otherwise the scanning device may continue scanning and storing additional documents.

Figure 5:
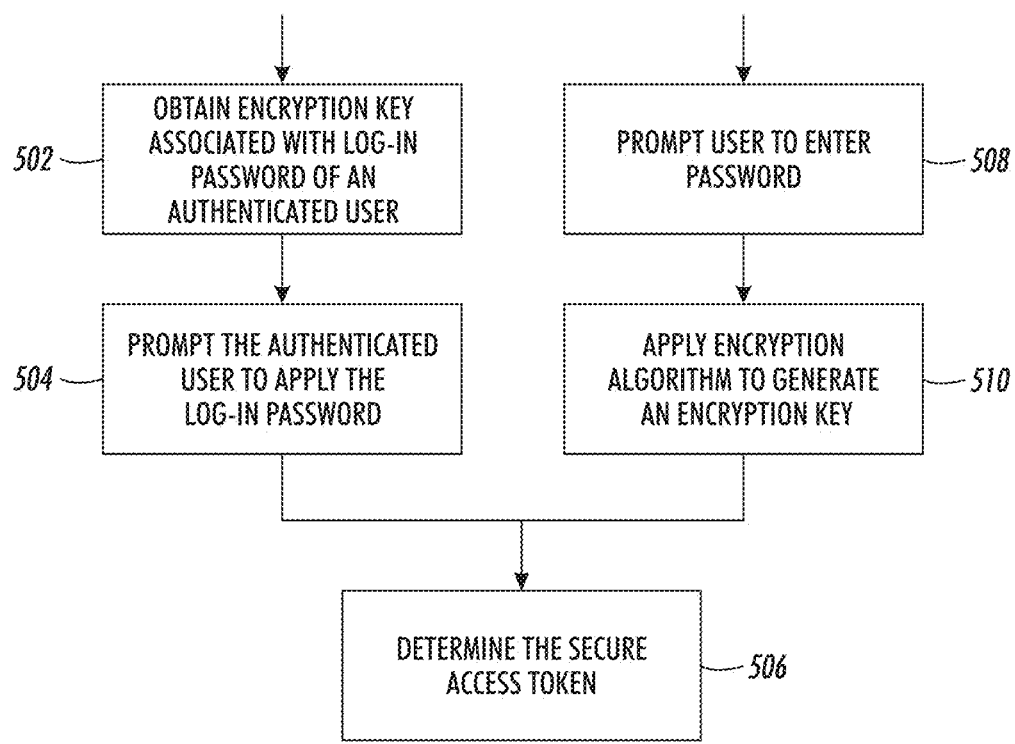
FIG. 5 is a diagram of a process of determining a secure access token.

In FIG. 5, in determining the secure access token, the scanning device may obtain the secure access token from a storage medium of the scanning device, from the portable memory device, or from a network. For example, the secure access token is an encryption key associated with a log-in password. In such a case, the scanning device may store one or more encryption keys associated with one or more authenticated users of the device in a storage medium in the scanning device or on a network. Upon an authenticated user logging into the scanning device with a log-in password, the scanning device may obtain an encryption key associated with the log-in password of the authenticated user 502 from the storage medium of the scanning device or from the network. The scanning device may determine the secure access token 506 to be the encryption key associated with the log-in password of the authenticated user. Optionally, the scanning device may output a prompt on a local user interface of the scanning device to prompt the authenticated user of the scanning device to confirm whether to apply the log-in password to the digital document file corresponding to the physical document 504. Upon user confirming to apply the log-in password, the scanning device will determine the secure access token 506 to be the encryption key associated with the log-in password of the authenticated user.

In other scenarios, the scanning device may prompt a user of the scanning device to enter a password on a LUI 508, and apply an encryption algorithm to generate an encryption key 510, and determine the secure access token 506 to be the generated encryption key. The scanning device may obtain instructions of an encryption algorithm from the portable memory device and execute the instructions in the scanning device to generate the encryption key. The instructions of the encryption algorithm may also be locally resided in the scanning device itself or on the network. There are various encryption algorithms for generating encryption keys from a password. For example, hash function, which is commonly used in mapping data of arbitrary size to a bit string of a fixed size, can be suitable for encrypting a password. Examples of password encryption algorithms include MD5 algorithm and SHA encryption algorithms.

Figure 6:
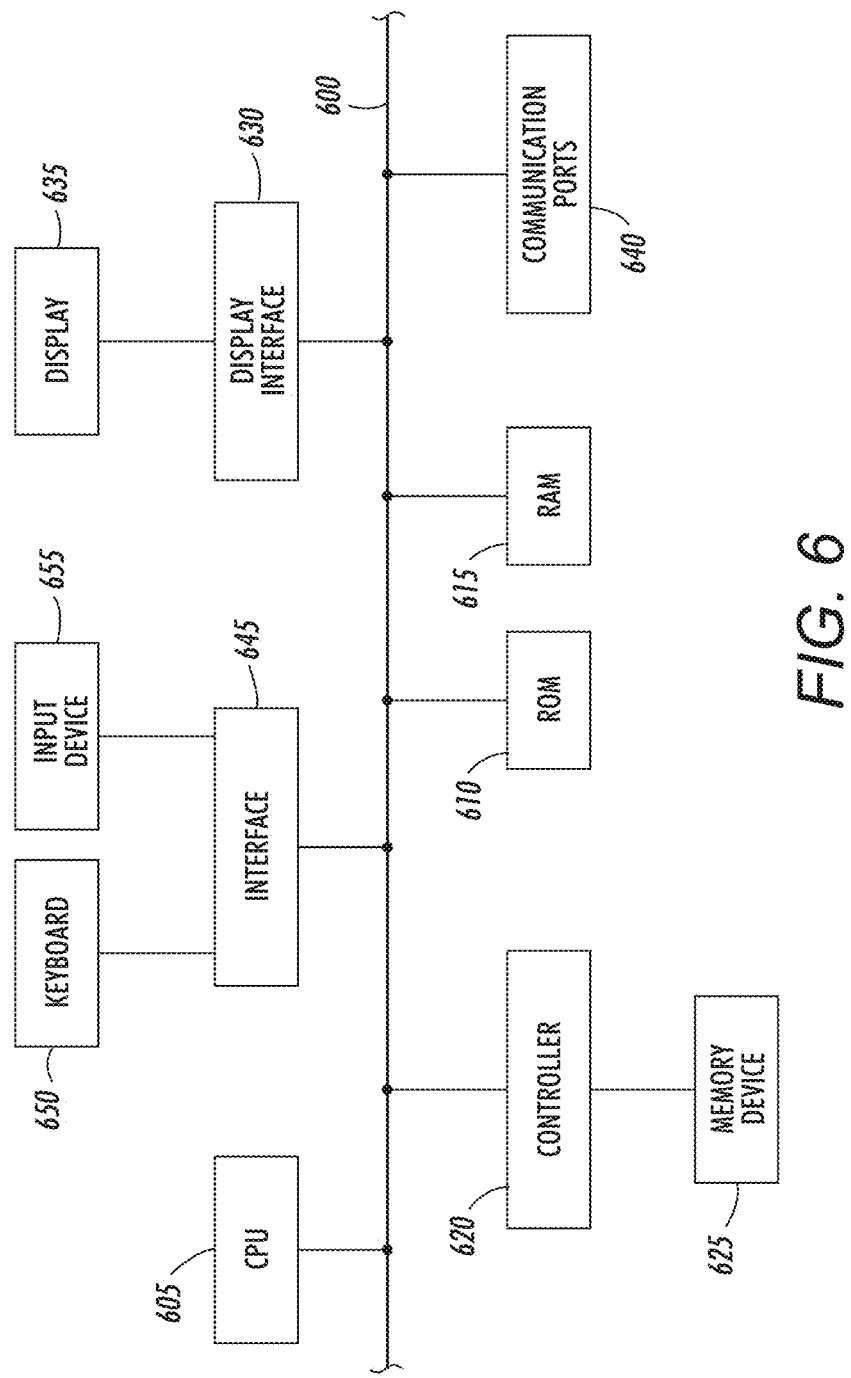
FIG. 6 is a block diagram of elements of a computing device on which the various systems and methods in this document could be implemented.

FIG. 6 depicts an example of internal hardware that may be included in any of the electronic components of the system, the scanning device or another device in the system such as the computer 110, or scanning device 120 (in FIG. 1). An electrical bus 600 serves as an information highway interconnecting the other illustrated components of the hardware. Processor 605 is a central processing device of the device, configured to perform calculations and logic operations required to execute programming instructions. As used in this document and in the claims, the terms "processor"

and "processing device" may refer to a single processor or any number of processors or processor cores in one or more processors. The device may include read only memory (ROM) 610, random access memory (RAM) 615. Other types of memory devices, such as flash memory, hard drives and other devices capable of storing electronic data constitute examples of memory devices 610. A memory device may include a single device or a collection of devices across which data and/or instructions are stored.

An optional display interface 630 may permit information from the bus 600 to be displayed on a display device 635 in visual, graphic or alphanumeric format. An audio interface and audio output (such as a speaker) also may be provided. Communication with external devices may occur using various communication ports or devices 640 such as a portable memory device reader/writer, a transmitter and/or receiver, an antenna, an RFID tag and/or short-range or near-field communication circuitry. The communication device 640 may be attached to a communications network, such as the Internet, a local area network or a cellular telephone data network.

The hardware may also include a user interface sensor 645 that allows for receipt of data from input devices such as a keyboard 650, a mouse, a joystick, a touchscreen, a remote control, a pointing device, a video input device (camera) and/or an audio input device (microphone). Various methods of activation, validation and/or authorization described in this document may be performed by the central processing device 605 or a controller 620.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

The invention claimed is:

1. A scanning device for automatically scanning and processing a document, comprising:
   a port for communicating with a portable memory device;
   an image sensor;
   a processing device; and
   a non-transitory computer-readable medium containing programming instructions that are configured to, when executed, cause the processing device to:
   detect a trigger event by detecting that the portable memory device is communicatively coupled to the port,
   upon detecting the trigger event, with no intermediary step required, automatically determine a scan instruction comprising at least one scan setting,
   automatically cause the image sensor to scan a physical document to generate a digital document file corresponding to the physical document based on the scan instruction,
   determine a secure access token, and
   save the digital document file to the portable memory device with the secure access token.

2. The scanning device of claim 1, wherein:
   the portable memory device includes a file system having a folder of a designated name; and
   the programming instructions for determining the scan instruction comprise programming instructions configured to retrieve the scan instruction from the folder of the designated name on the portable memory device.

3. The scanning device of claim 1, wherein the secure access token is an encryption key that is associated with a log-in password of an authenticated user of the scanning device.

4. The scanning device of claim 3, wherein the programming instructions are further configured to cause the processing device to obtain the encryption key from a storage medium of the scanning device or from a network.

5. The scanning device of claim 3, wherein the programming instructions are further configured to cause the processing device to output a prompt on a local user interface of the scanning device to prompt the authenticated user of the scanning device to confirm whether to apply the log-in password to the digital document file corresponding to the physical document.

6. The scanning device of claim 3, wherein the programming instructions are further configured to cause the processing device to:
   prompt a user of the scanning device to enter a password on a local user interface of the scanning device; and
   apply an encryption algorithm to generate the encryption key.

7. The scanning device of claim 1, further comprising a document handler, wherein the programming instructions are further configured to cause the processing device to:
   upon detecting that the trigger event has occurred, detect whether a physical document is placed on the document handler of the scanning device; and
   if a physical document is not placed on the document handler, output a message via a user interface to prompt a user to load a physical document to the document handler.

8. The scanning device of claim 7, wherein the computer-readable medium comprises additional programming instructions that will cause the processing device to:
   upon saving the digital document file on the portable memory device, detect an additional trigger event by detecting that an additional physical document is placed on the document handler;
   automatically cause the image sensor to scan the additional physical document and generate a digital document file based on the scan instruction; and
   automatically save the digital document file to the portable memory device with the secure access token.

9. The scanning device of claim 8, wherein the scan instruction also comprises a maximum number of scans, and wherein the computer-readable medium comprises additional programming instructions that will cause the processing device to:
   count a number of scans after scanning each additional physical document; and
   suspend scanning additional physical documents when the counted number of scans exceeds the maximum number of scans.

10. The scanning device of claim 1, wherein:
    the physical document comprises multiple pages and the scan instruction further comprises a one-file-per-page setting; and
    the programming instructions for saving the digital document file to the portable memory device comprise programming instructions configured to save multiple digital document files to the portable memory device, each document file containing a digital representation of a page of the physical document.

11. A method for automatically scanning and processing a document, comprising, by a processing device:
- detecting a trigger event by detecting that a portable memory device is communicatively coupled to a port of a scanning device;
- upon detecting the trigger event, with no intermediary step required, automatically determining a scan instruction comprising at least one scan setting;
- automatically causing an image sensor of the scanning device to scan a physical document to generate a digital document file corresponding to the physical document based on the scan instruction;
- determining a secure access token; and
- saving the digital document file to the portable memory device with the secure access token.

12. The method of claim 11, wherein:
- the portable memory device includes a file system having a folder of a designated name; and
- determining the scan instruction comprises retrieving, by the processing device, the scan instruction from the folder of the designated name on the portable memory device.

13. The method of claim 12, further comprising determining, by the processing device and based on the designated name of the folder or data contained in the folder, that the digital document file corresponding to the physical document be stored in the folder of the designated name with security protection.

14. The method of claim 11, wherein the secure access token is an encryption key that is associated with a log-in password of an authenticated user of the scanning device.

15. The method of claim 14, further comprising obtaining, by the processing device, the encryption key from a storage medium of the scanning device or from a network.

16. The method of claim 15, further comprising: outputting, by the processing device, a prompt on a local user interface of the scanning device to prompt the authenticated user of the scanning device to confirm whether to apply the log-in password to the digital document file corresponding to the physical document.

17. The method of claim 14, further comprising, by the processing device:
- prompting a user of the scanning device to enter a password on a local user interface of the scanning device; and
- applying an encryption algorithm to generate the encryption key.

18. The method of claim 11, wherein detecting the trigger event also comprises detecting that the physical document is placed on a document handler of the scanning device.

19. The method of claim 18, further comprising:
- upon saving the digital document file on the portable memory device, detecting an additional trigger event by detecting that an additional physical document is placed on the document handler;
- automatically causing an image sensor of the scanning device to scan the additional physical document and generate a digital document file based on the scan instruction; and
- automatically saving the digital document file to the portable memory device with the secure access token.

20. The method of claim 19, wherein the scan instruction also comprises a maximum number of scans, further comprising:
- counting, by the processing device, a number of scans after scanning each additional physical document; and
- suspending scanning additional physical documents when the counted number of scans exceeds the maximum number of scans.

21. The method of claim 11, further comprising, by the processing device:
- upon detecting that the trigger event has occurred, detecting whether a physical document is placed on a document handler of the scanning device; and
- if a physical document is not placed on the document handler, outputting a message via a user interface to prompt a user to load a physical document to the document handler.

22. The method of claim 11, wherein:
- the physical document comprises multiple pages and the scan instruction further comprises a one-file-per-page setting; and
- saving the digital document file to the portable memory device comprises saving multiple digital document files to the portable memory device, each document file containing a digital representation of a page of the physical document.

23. A portable memory device, comprising a non-transitory computer-readable medium containing a file system that contains:
- a folder of a designated name, the folder containing a scan instruction and configured to be identifiable and retrievable by a scanning device when the portable memory device is communicatively coupled to the scanning device and detected by the scanning device, with no intermediary step required; and
- programming instructions containing an encryption algorithm and retrievable by the scanning device;
- wherein the scan instruction and the programming instructions are configured to be automatically determined by the scanning device, with no intermediary step required, after the portable memory device is detected by the scanning device; and
- wherein the scan instruction and the programming instructions are configured to, when retrieved by the scanning device, cause the scanning device to:
  - cause an image sensor to scan a physical document and generate a digital document file corresponding to the physical document based on the scan instruction,
  - use the encryption algorithm to generate a secure access token, and
  - save the digital document file to the portable memory device with the secure access token.

24. The portable memory device of claim 23, wherein the programming instructions further comprise instructions that, when retrieved by the scanning device, will cause the scanning device to determine, based on the designated name of the folder or data contained in the folder, that the digital document file corresponding to the physical document be stored in the folder of the designated name with security protection.

25. The portable memory device of claim 24, wherein the programming instructions further comprise programming instructions that, when retrieved by the scanning device, will cause the scanning device to output a prompt on a local user interface of the scanning device to prompt an authenticated user of the scanning device to confirm whether to apply a log-in password of the authenticated user to generate the secure access token.

26. The portable memory device of claim 24, wherein the programming instructions further comprise programming instructions that, when retrieved by the scanning device, will cause the scanning device to:

prompt a user of the scanning device to enter a password on a local user interface; and apply the encryption algorithm to generate the secure access token.

27. The portable memory device of claim 23 is communicatively coupleable to an external device or a communication network to pre-configure the folder through a web user interface.

* * * * *